US008819757B2

(12) United States Patent
Rivera (10) Patent No.: US 8,819,757 B2
(45) Date of Patent: Aug. 26, 2014

(54) ADVANCED WIRELESS IPTV SET TOP BOX

(76) Inventor: Manolo Fabio Rivera, Maspeth, NY (US)

( * ) Notice: Subject to any disclaimer, the term of this patent is extended or adjusted under 35 U.S.C. 154(b) by 0 days.

(21) Appl. No.: 13/374,721

(22) Filed: Jan. 10, 2012

(65) Prior Publication Data

US 2012/0304238 A1      Nov. 29, 2012

Related U.S. Application Data

(60) Provisional application No. 61/431,476, filed on Jan. 11, 2011.

(51) Int. Cl.
    *H04N 7/16*          (2011.01)
(52) U.S. Cl.
    USPC .............. 725/131; 725/85; 725/139; 725/151
(58) Field of Classification Search
    CPC .................................................. H04N 21/4263
    See application file for complete search history.

(56) References Cited

U.S. PATENT DOCUMENTS

| | | | |
|---|---|---|---|
| 5,742,680 A | | 4/1998 | Wilson |
| 6,081,291 A | * | 6/2000 | Ludwig, Jr. ................ 348/14.11 |
| 6,151,354 A | | 11/2000 | Abbey |
| 7,363,002 B2 | | 4/2008 | Hill |
| 7,831,228 B2 | | 11/2010 | Li |
| 7,895,631 B1 | | 2/2011 | Stark |
| 2003/0038897 A1 | * | 2/2003 | Shiotsu ......................... 348/725 |
| 2004/0230997 A1 | * | 11/2004 | Kaylani ....................... 725/111 |
| 2005/0091693 A1 | | 4/2005 | Amine |
| 2006/0041923 A1 | | 2/2006 | McQuaide |
| 2007/0107019 A1 | | 5/2007 | Romano |
| 2008/0092199 A1 | * | 4/2008 | McCarthy et al. ............ 725/133 |
| 2008/0155636 A1 | | 6/2008 | Cruz |
| 2009/0003386 A1 | | 1/2009 | Mathur |
| 2009/0189828 A1 | * | 7/2009 | Shmulevich et al. ......... 343/876 |

FOREIGN PATENT DOCUMENTS

WO     WO2006088263 A2     8/2006

OTHER PUBLICATIONS

Wattenhofer, R., Chapter 8: Mobile IP and TCP. Presentation. Summer 2002, Distributed Computing Group, Mobile Computing.
Ioan Vlad Uilecan et al., Framework for Delivering IPTV Services Over Wimax Wireless Networks, Journal Article, 2007, IEEE EIT 2007 Proceedings, USA.
Retnasothie, F.E. et al., Wireless IPTVE over WiMAX: Challenges and Applications, Conference Publication, Wireless and Microwave Technology Conference, 2006. WAMICON '06. IEEE Annual, Dec. 4-5, 2006.
Yucek, Tevfik et al., A Comparative Study of Initial Downlink Channel Estimation Algorithms for Mobile WiMAX, Conference Publication, Mobile WiMAX Symposium, 2007. IEEE, Mar. 25-29, 2007.

* cited by examiner

*Primary Examiner* — Fernando Alcon
(74) *Attorney, Agent, or Firm* — Eric A. Greenbaum, Esq.

(57) ABSTRACT

An advanced wireless IP STB is provided with multiple built-in antennas capable of capturing plural downstream transmissions simultaneously on dedicated receivers using different modem technologies without the use of wires to the home. The proposed solution facilitates the advanced wireless IP STB being able to receive multiply sourced data traffic, including, for example, IPTV, digital TV, web TV, radio web, internet chat: written, voice and video, GPS tracking locator signals, media player web support, web based video gaming, You Tube and the like video streaming, TV surveillance, video intercom surveillance, and much more. The advanced wireless IP STB is configured to be able to establish a broadband (internet) session through previously assigned or negotiated channel assignments between one or more modems and plural remote wireless infrastructures widely deployed in a municipality, such as WIMAX, LTE, WCDMA, CDMA 1x, TDSCMA, GSM, GPRS, EDGE, 5G or the like.

23 Claims, 6 Drawing Sheets

FIG.5

FIG.6 BOARD PHONE

ADVANCED WIRELESS IPTV SET TOP BOX

CROSS-REFERENCE TO RELATED APPLICATIONS

The present Application for Patent claims priority benefit of Provisional Application Ser. No. 61/431,476 filed Jan. 11, 2011. This provisional patent application is hereby expressly incorporated by reference herein in its entirety.

BACKGROUND

1. Field

The present disclosure relates to advanced IPTV set top boxes.

2. Background Information

Internet Protocol Television, or IPTV, refers to television that is distributed over an IP network—the same kind of network used to surf the internet and exchange emails. In reality, much more than television can be sent over a network. Using IPTV technology, it is easy to distribute terrestrial and satellite television and radio, videos/DVDs, digital videos on-demand (VoDs), digital signage, information boards, and web content to a facility or home. All of this multimedia content can be viewed on standard and high definition TVs as well as personal computers.

There are different forms of IPTV. "Internet IPTV" is delivered over the internet to and from anywhere in the world. An example of this would be home videos on YouTube.com or TV programs on Zattoo. As this type of IPTV travels over the public internet, there is no effort to optimize bandwidth or content delivery. Videos are easily displayed in a web browser but usually at low quality and with delays in transmission.

Telco IPTV is delivered by a phone/internet/cable provider, also referred to as a telecommunications provider or Telco. Often the television programs one watches at home have travelled across an IP network in the same fashion as internet traffic—and now some phone services such as SKYPE VoIP—is delivered. Telco has the ability to implement quality of service mechanisms that ensure reliable delivery of live and on-demand content. With on-demand TV shows, TV content is stored on a server somewhere on the provider's network.

Broadcast IPTV is when television broadcasters transmit their programming onto the internet for public consumption via personal computers. Many channels are broadcast for free, while others charge a fee for subscribing to their service. Unfortunately, broadcasters have no control over bandwidth or quality of service.

With all forms of IPTV, television and video can easily be supplied to various consumer premises equipment, including set top boxes so long as coupled to an existing IP network infrastructure.

A major benefit of IPTV is that new building construction can forego the need of setting up a coaxial network. Audio and video can instead be received via a phone line. Even phone lines are now becoming obsolete with VoIP becoming the dominant form of voice communication medium, and wireless access commonplace.

WiMAX (Worldwide Interoperability for Microwave Access) is a telecommunications protocol that provides fixed and fully mobile internet access. The current WiMAX revision provides up to 40 Mbit/s with the IEEE 802.16m update expected to offer up to 1 Gbit/s fixed speeds. The name "WiMAX" was created by the WiMAX Forum, which was formed in June 2001 to promote conformity and interoperability of the standard.

The forum describes WiMAX as "a standards-based technology enabling the delivery of last mile wireless broadband access as an alternative to cable and DSL". The "last mile" or "last kilometer" is the final leg of delivering connectivity from a communications provider to a customer. The phrase is therefore often used by the telecommunications and cable television industries. The actual distance of this leg may be considerably more than a mile, especially in rural areas. It is typically seen as an expensive challenge because "fanning out" wires and cables is a considerable physical undertaking. Because the last mile of a network to the user is also the first mile from the user to the world, the term "first mile" is sometimes used.

To solve the problem of providing enhanced services over the last mile, some firms have been mixing networks for decades. One example is fixed wireless access, where a wireless network is used instead of wires to connect a stationary terminal to the wireline network.

Various solutions are being developed which are seen as an alternative to the "last mile" of standard incumbent local exchange carriers: these include WiMAX and BPL (Broadband over Power Line) applications.

The 802.16-2004 version of WiMAX, also known as 802.16d, refers to the working party that developed this standard. It is sometimes referred to as "Fixed WiMAX," because it has no support for mobility. By contrast, 802.16e-2005, often abbreviated to 802.16e, is an amendment to 802.16-2004. It introduced support for mobility, among other things and is therefore also known as "Mobile WiMAX".

Mobile WiMAX is the WiMAX incarnation that has the most commercial interest to date and is being actively deployed in many countries. Mobile WiMAX is also the basis of future revisions of WiMAX. For purposes of this disclosure, WiMAX is used to refer to both standards interchangeably.

The bandwidth and range of WiMAX make it suitable for providing fixed and portable mobile broadband connectivity across cities and countries through a variety of devices. It can be used to reliably and cost-effectively provide a wireless alternative to cable and DSL for "last mile" broadband access. Broadband (internet) access, of course, facilitates providing data, telecommunications (VoIP) and IPTV services (triple play), gaming services and the like services traditionally available to end users via a cable, DSL, or even satellite receiver.

As more and more companies are deploying WiMAX to provide mobile broadband or at-home broadband connectivity across whole cities or countries, this has resulted in competition in markets which typically only had access to broadband through an existing incumbent DSL (or similar) operator.

Additionally, given the relatively low cost to deploy a WiMAX network (in comparison to GSM, DSL or Fiber-Optic), it is now possible to provide broadband in places where it might have been previously economically unviable.

With the proliferation of wireless broadband access and the availability of digital television, advanced STBs which typically were able to provide IPTV functionality via a wired link in the home (via PSTN, cable or satellite) can instead use an external WiMAX receiver as a "last mile" alternative for establishing the needed broadband connection to the STB or PC in the home.

Unfortunately, despite the proliferation of wireless technologies, end user equipment suffer from the fact that a particular wireless modem may not be supported by the actual network infrastructure deployed in a given area. Even if it is, there is still the issue of the hardware being designed to operate in the available frequency bands. In addition, the bandwidth capabilities, and thus quality of service requirements, very much depend on the distance of the modem from the network.

In this regard, an IP STB designed to connect to an IP broadband network over a wireless broadband connection, such as for example WiMAX may not be feasible for a large number of operating environments where last mile wired facilities are otherwise available.

It is desirable to have advanced wireless IPTV set top boxes that have the flexibility of conventional wired IPTV set top boxes and address the disadvantages of conventional wireless IPTV set top boxes.

SUMMARY

The present disclosure is directed to an advanced wireless IP STB provided with multiple built-in antennas capable of capturing plural downstream transmissions simultaneously on dedicated receivers using different modem technologies without the use of wires to the home.

The proposed solution facilitates the advanced wireless IP STB being able to receive multiply sourced data traffic, including, for example, IPTV, digital TV, web TV, radio web, internet chat: written, voice and video, GPS tracking locator signals, media player web support, web based video gaming, You Tube and the like video streaming, TV surveillance, video intercom surveillance, and much more.

In one aspect, the advanced wireless IP STB is configured to be able to establish a broadband (internet) session through previously assigned or negotiated channel assignments between one or more modems and plural remote wireless infrastructures widely deployed in a municipality, such as WIMAX, LTE, WCDMA, CDMA 1x, TDSCMA, GSM, GPRS, EDGE or the like.

The STB analyzes the data traffic on all available frequency bands available to receive and establish a broadband connection, and uses appropriate metrics, priority schemes, and the like, to establish multiple links to one or more websites on the internet. Each link can be a simple broadcast link, a unicast link, or a multicast link, depending on the modem capabilities, the desired user data traffic, and quality of service requirements.

In one aspect, the IPTV provider includes as its service offering downloadable applications, web-based gaming, and other user applications. In this way, content providers ensure being fairly compensated by partnering agreements that reduce the motivation of end-users to download illegal content. Easy access to legal content also benefits end users as who benefit from knowing the source of downloaded material is safe and thus more likely to seek to download.

In another aspect, the IPTV provider negotiates with one or more network carriers to secure proprietary frequency allocation in order to better control bandwidth and scheduling resources, and in this way also provide a broader range of services.

In another aspect, by introducing a delay in transmission signals on the network end, the IPTV provider is able to have the hardware in the IPTV STB manage a sufficient time to determine the bandwidth capacity of a different wireless technology capable of handling data traffic (e.g., IPTV, VoIP, web TV, or other content being downloaded or streamed) to maximize user experience.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

The present disclosure is directed to an advanced wireless IP STB provided with multiple built-in antennas capable of capturing plural downstream transmissions simultaneously on dedicated receivers using different modem technologies without the use of wires to the home.

The proposed solution facilitates the advanced wireless IP STB being able to receive multiply sourced data traffic, including, for example, IPTV, digital TV, web TV, radio web, internet chat: written, voice and video, GPS tracking locator signals, media player web support, web based video gaming, You Tube and the like video streaming, TV surveillance, video intercom surveillance, and much more.

In one scenario, the advanced wireless IP STB is configured to be able to establish a broadband (internet) session through previously assigned or negotiated channel assignments between one or more modems and plural remote wireless infrastructures widely deployed in a municipality, such as WIMAX, LTE, WCDMA, CDMA 1x, TDSCMA, GSM, GPRS, EDGE or the like.

The STB analyzes the data traffic on all available frequency bands available to receive and establish a broadband connection, and uses appropriate metrics, priority schemes, and the like, to establish multiple links to one or more websites on the interne. Each link can be a simple broadcast link, a unicast link, or a multicast link, depending on the modem capabilities, the desired user data traffic, and quality of service requirements.

The IPTV provider includes as its service offering downloadable applications, web-based gaming, and other user applications. In this way, content providers ensure being fairly compensated by partnering agreements that reduce the motivation of end-users to download illegal content. Easy access to legal content also benefits end users as who benefit from knowing the source of downloaded material is safe and thus more likely to seek to download.

The IPTV provider can also negotiate with one or more network carriers to secure proprietary frequency allocation in order to better control bandwidth and scheduling resources, and in this way also provide a broader range of services.

By introducing a delay in transmission signals on the network end, the IP TV provider is able to have the hardware in the IPTV STB manage a sufficient time to determine the bandwidth capacity of a different wireless technology capable of handling data traffic (e.g., IPTV, VoIP, web TV, or other content being downloaded or streamed) to maximize user experience.

Figure 1:
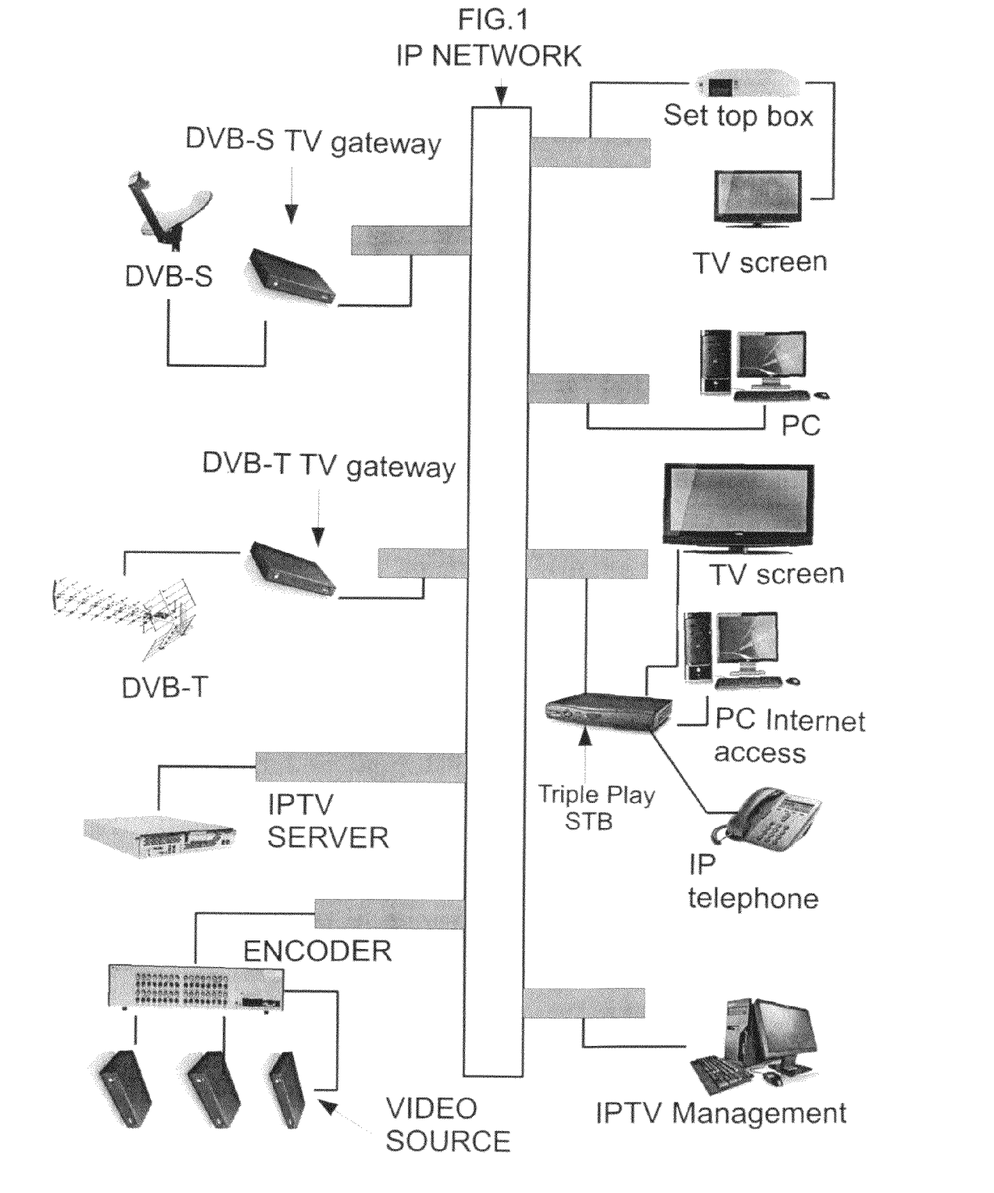
FIG. 1 is an example of an end-to-end IPTV system.

FIG. 1 is an example of an end-to-end IPTV system.

The end-to-end IPTV system, as shown, consists of head-end equipment and user-end equipment coupled via a broadband IP network to receive appropriate audio/video and general IP traffic data.

The head-end equipment includes a streaming server, a video server, and a level III device.

The streaming server encodes and streams live streams in real-time and pre-encoded streams that are stored on the video server. The streaming server transmits the streams to the switch or router which transfers them over the backbone to the central/remote offices and from there to the end user location.

Video servers fulfill several purposes. For store and forward transmissions, video servers store digitally encoded content and stream it through level III devices via operators' networking infrastructure. Video servers receive newly encoded digital content that is uploaded from the streaming server. Video servers also enable time shifted TV applications. Viewers at home can then watch any program at a time convenient to them.

A level III device is a switch or router that supports multicast transmission. The router or switch resides at the head-end, interfacing with the network. Another router or switch receives data at the central office and transmits either to DSLAMS located there, or directly to equipment in the user end.

The user-end equipment is coupled to the broadband IP network and configured to receive the TV/IP stream. The user end may include an external or internally integrated modem, such as a DSL, cable or satellite modem, or may be a wireless WiMAX, WiFi or the like wireless telecommunications modem. This modem receives the stream from the DSLAM or Level III device and transfers it directly to the user-end equipment, for example a PC for display on the desktop or to the IP STB for display directly on a TV. An IP STB functions as a gateway between the TV set/PC and the broadband IP network via a PSTN, satellite or cable link. In this regard, an IP STB provides all the necessary signal processing-receiving, and decoding/decompressing, as well as also accepts commands from the user and transmits these commands back to the network, often through a back channel.

The above described advanced IP STBs are capable of functioning, among other ways, as a TV signal receiver, a modem, a game console, a web browser, as well as support e-mail capabilities, video-conferencing, and IP telephony over a broadband network link.

In addition, advanced IP STBs may be equipped with additional components and functionality such as with Electronic Program Guide (EPG), CD ROM, DVD player, and the like.

IPTV network capable STBs include bandwidth dimensioning as IPTV and VoD services require high bandwidth capacities and predictable performance, placing additional requirements on the network. When designing an STB it is known to take into consideration compression and coding technology transmission rate requirements. The key parts include hardware, a data network interface, a decoder, a memory buffer, and synchronization hardware routines.

As already mentioned, conventional advanced STBs capable of IPTV functionality have a common disadvantage in that the link to the backend is via a wired link into the home, be it from the cable to the home, the wire from the satellite to the set top box, or the wire to the DSL modem.

A solution proposed herein, in accordance with the advanced IP STB of the present invention, eliminates the need for wires to the home. The advanced IP STB is able to receive plural broadband connections, and does so in a manner without compromising quality of service requirements or bandwidth challenges of the wireless environment.

In a preferred embodiment, the advanced wireless IP STB includes a WIMAX modem for establishing a link to widely deployed WIMAX infrastructure from which IPTV signal reception is possible and made available to owners of the STB either through a dynamically assigned frequency or by a dedicated frequency assignment associated with the STB. In the latter instance, it is contemplated that the service provider owns IPTV capable transmission frequencies over for example, a 4G radio network such as WIMAX, or alternatively, over a 3.5G or 3G radio network.

In an illustrative embodiment, in order to analyze the best radio resource (WIMAX, LTE, 3G, 2G, etc) to assign contemporaneously occurring functions in the STB, such handling of IPTV, voice telephony, and internet browsing simultaneously, synchronization algorithms are provided which receive the various broadband data traffic from each resource, buffer it to optimize its handling, and at same time, introduce a small transmission frame delay, to make the overall frequency allocation/reallocation and resource handling as transparent as possible.

A number of exemplary embodiments of the present invention will now be described with reference to FIGS. 2 to 6.

Figure 2:
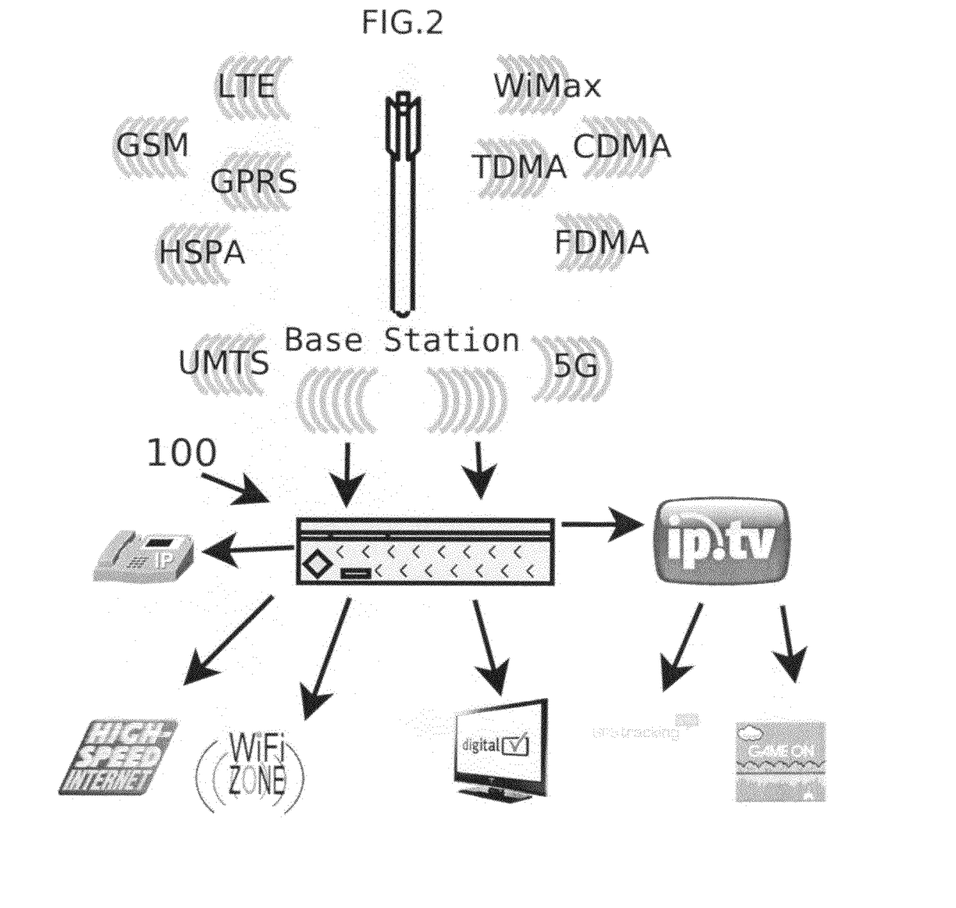
FIG. 2 is a functional block diagram of an advanced IPTV set top box (STB) in accordance with a preferred embodiment of the invention.

FIG. 2 is a functional block diagram of an advanced IPTV set top box (STB) 100 in accordance with a preferred embodiment.

As shown, STB 100 is configured to operate over different wireless communication protocols, using built-in antennas (not shown). The wireless communication protocols comprise both short range communication links (e.g., WiFi, Bluetooth) as well as long range wireless communication links (e.g., GSM, GPRS, LTE, HSPA, WiMAX, CDMA. TDMA, FDMA, UMTS and 5G radio technologies). In accordance with the preferred embodiment, STB 100 provided IPTV, gaming services, GPS tracking services, digital TV, WiFi zone services, high speed internet, VoIP services, and other unicast, multicast and broadcast IP services directly through one or more of the above mentioned wireless links.

Figure 3:
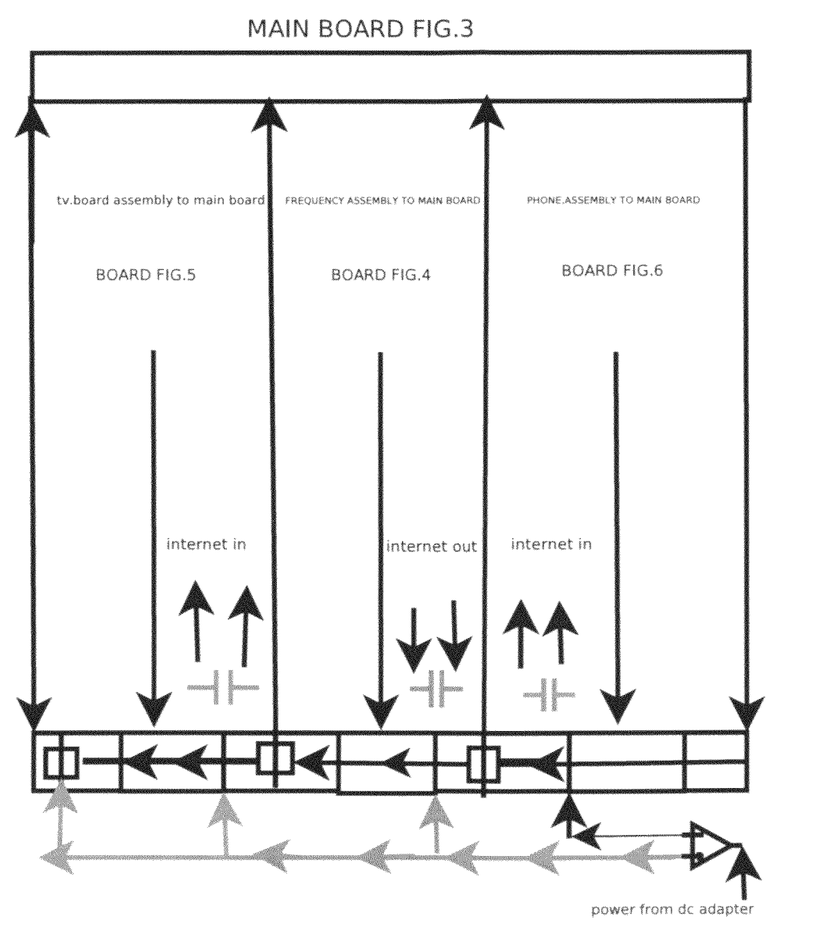
FIG. 3 is a functional main board diagram of the STB 100 of the invention. As shown, STB 100 includes a main board coupled to a frequency board assembly, a TV board assembly, and a phone board assembly, shown in greater detail in FIGS. 4-6, respectively.

FIG. 3 is a functional main board diagram of STB 100. As shown, STB 100 includes a main board coupled to a frequency board assembly, a TV board assembly, and a phone board assembly, shown in greater detail in FIGS. 4-6, respectively.

Figure 4:
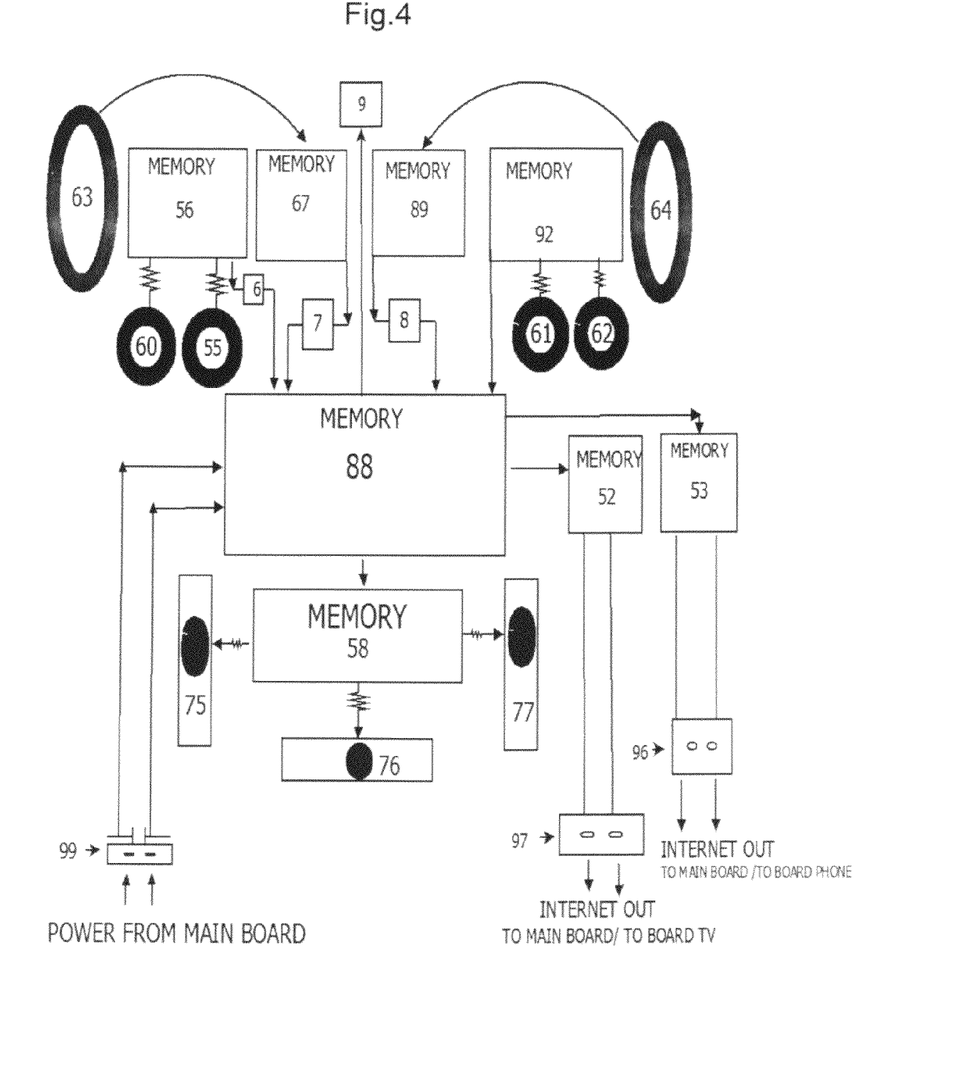
FIG. 4 is high level block diagram of the frequency board assembly (FBA) in FIG. 3.

FIG. 4 is high level block diagram of the frequency board assembly (FBA) in FIG. 3.

Figure 5:
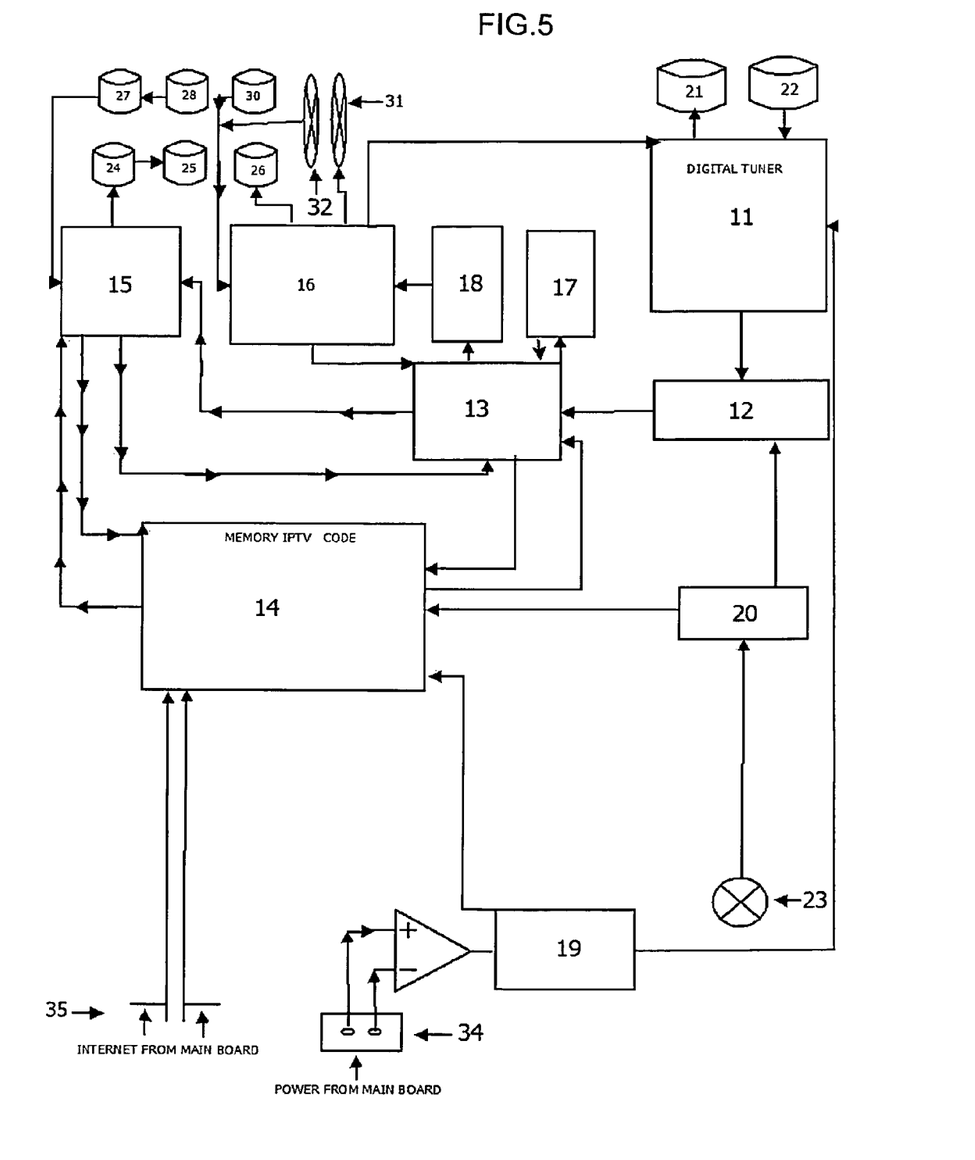
FIG. 5 is high level block diagram of the TV board assembly (TVBA) in FIG. 3.

FIG. 5 is high level block diagram of the TV board assembly (TVBA) in FIG. 3.

Figure 6:
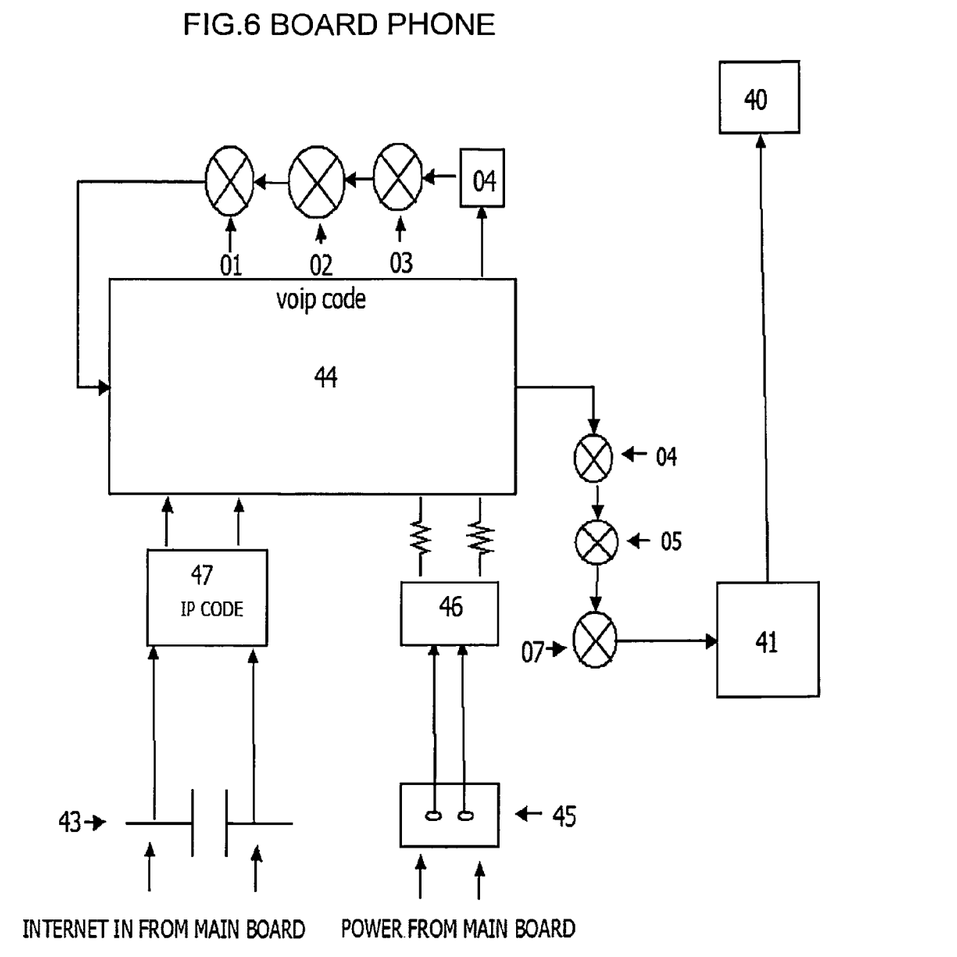
FIG. 6 is high level block diagram of the phone board assembly (PBA) in FIG. 3.

FIG. 6 is high level block diagram of the phone board assembly (PBA) in FIG. 3.

Referring to FIG. 4, FBA includes a set of antennas (55, 60, 61, 62, 63, 64). These antennas capture IP data packets and other RF signals transmitted from one of the associated wireless links over frequencies set by the STB in cooperation with the wireless service provider. The captured RF signals are stored in and across a number of memory banks (56, 67, 89, 92), where they are processed/demodulated using known techniques, filtered by filters 7, 8, and eventually stored as a set of signals from various sources in addressable locations in memory (CPU block) 88.

Antennas 55 and 60 capture RF signals and send them to element 56, where decode action takes place and the signal is delivered to filter 6 for filtering, after which it is delivered into memory 88. Similarly, antenna 63 captures corresponding RF signals and sends them to element 67, where decode action takes place and the signal is delivered to filter 7 for filtering, after which it is delivered into memory 88. Finally, antennas 61 and 62 capture RF signals and send them to element 92, where decode action takes place and the signal is delivered into memory 88.

Memory 88 processes the information delivered to identify a strongest signal received. This signal is converted into multimedia (audio/video) IP packets and transported to memory 58.

The IP packets in memory 58 are further amplified by an appropriate WiFi transmitter (not shown). In one exemplary embodiment, these packets are then transmitted from WiFi antennas 75, 76, and 77 at a range up to 300 Mbps (at frequency of 2.4-2.462 GHz).

Additional IP packets from memory 88 arrive at memory 52. Memory 52 is coupled via an internal wired interface to the TVBA of STB 100. This internal wired interface terminates at output connection 97. Output connection 97 in turn is coupled to the input connection 35 of the IPTV board assembly shown in FIG. 5.

Alternatively, IP packets from memory 88 are forwarded to memory 53 which is coupled via internal wired output connection 96 to PBA of STB 100. This wired output connection 96 in turn is coupled to the input connection 43 of PBA shown in FIG. 6.

In another embodiment, memory 88 is connected to a personal computer or other portable multimedia device via wired interface 9. Wired interface 9 could be an RJ45 interface, USB, or other high speed IP packet data link.

Memory 88 includes a main processor (not shown) and optionally includes a plurality of memory elements, each separately addressable, along with the other functional blocks, and powered by a power input connection 99 coupled to the main board in FIG. 3.

Referring to FIG. 5, video IP data packets from the FBA arrive at TVBA via input connection 35. These packets feed directly to memory IPTV code block 14 and are processed by memory video processor element 13. The processed signals are coupled to memory decoded video block 18 and forwarded to memory block 16 which converts them to an appropriate video display format. The stored video is coupled to video out connection 26 and from there transported to HDMI connection interface 31 and tuner TV out interface 21. Alternate signals sources may also be provided via video in connections 30 and 32. Here, separate video format signal streams feed into data memory 16. From memory 16, signals are received and processed by video processor block 13, fed to memory IPTV code block 14, back to video processor block 13, where they are in similar fashion as before forwarded to memory decoded video block 18 and memory block 16.

A separate TV signal input 22 communicates with digital tuner 11 which in turn is coupled to video processor data block 12. The signals from there are fed to memory decoded video block 18 and then memory 16 where they are converted in a manner similar to other streams to a format adaptable for interfacing with appropriate display media, via video out connection 26, or HDMI interface 31, or tuner TV out interface 21.

In an exemplary embodiment, memory element 17 is a separate storage memory. Video processor block 13 delivers data to be stored in element 17. In response to a command "recall data", data is transferred from memory 17 to video processor block 13 for immediate user availability.

Memory IP code block 14 also communicates with audio data convert block 15. Audio IP packets from audio data convert block 15 are received by audio out interfaces 24 and 25. Audio in interfaces 27 and 28 communicate with audio data converter 15 to receive external audio signals. These signals are filtered by filter 13 and returned to audio data convert block 15. From there, the feed is sent to memory IP code block 14 and back to audio data convert block 15. In this way, audio out signals are generated via audio out interfaces 24, 25 to a connected speaker system (not shown).

In another embodiment, LED 23 is provided to receive command from an external wireless remote control (not shown). The received LED signals are stored in memory 20 and processed to respond to appropriate remote control user commands. The different associated TV tasks, such as volume and channel selection are electronically processed by memory IPTV code block 14 to perform the selected, in this case, IPTV function.

In Digital TV mode, LED 23 receives user commands from the remote control, and via an interface to video processor data block 12, triggers block 12 to perform the selected digital TV function.

As with the FBA, main board power is received via input power node connection 34. A voltage regulator 19 regulates the power supply signal and sources memory IPTV code block 14, video processor data block 12, and all associated TVBA elements.

FIG. 6, the phone board assembly, sets out the voice over IP (VoIP) functions supported by STB 100. Here, IP voice packets are received from output connection 97 (FIG. 4) which are fed directly from the main board (FIG. 3). These are received via input connection interface 43 which are then received and stored in IP code block 47.

The data from IP code block 47 is then processed and stored in VoIP code block 44 where it is separately converted into voice and data. From there, the associated information is received by a chain of voice filters (04+03+02+01) which filter (clean) the signal to improve quality.

The cleaned voice signals are then sent back into VoIP code block 44, further filtered by data filters (05+06+07) and eventually transported to memory block 41 which functions to rectify associated voice and data signals, before transporting to output phone jack 40.

Power to the PBA is supplied from the main board (FIG. 3) through power input connection 45 and regulated by voltage regulator 46. The regulated voltage supply feeds power to VoIP code block 44 and other key components on PBA of STB 100.

The illustrative combination of elements shown in FIGS. 4 to 6 provide an improved IPTV set top box that eliminates the wires to the home solutions of conventional set top boxes.

Using multiple radio networks with which to establish wireless links to remote locations away from the home, most typically wide area network radio networks, such as 2G, 3G and 4G cellular radio networks, but in combined form, it is possible to replace satellite, cable and DSL links to the home in many cases.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless set top box (STB) including plural radio network receivers for processing at least an IPTV signal over a first broadband link to a first radio network and a second broadband link to a second radio network, where the first and second broadband links are between the wireless STB and a wide area network, the wireless set top box further comprising multiple antennas for capturing plural downstream transmissions on dedicated receivers using a plurality of modem technologies without the use of wires to the home; and a processor to establish, based on at least one of predefined metrics and priority schemes, data traffic links to at least two of the plurality of modem technologies simultaneously;

wherein the STB includes a main board providing power and coupled to a frequency board assembly (FBA), a TV board assembly (TVBA) and a phone board assembly (PBA), and including the processor;

wherein the FBA further comprises the multiple antennas which capture RF signals, including IP data packets, from one of the wireless links, the FBA further decoding, filtering, and delivering the RF signals to a first memory within the FBA where a strongest signal received is identified and converted into video IP data packets;

wherein the video IP data packets are sent from the FBA to the TVBA via a corresponding internal input connection;

wherein the video IP data packets are processed in the TVBA and fed into a second memory within the TVBA where they are converted into an appropriate display format;

wherein the TVBA further comprises a digital tuner receiving a separate TV signal input, the separate TV signal input being processed in the TVBA and fed into the second memory where the signal is converted into an appropriate display format; and wherein the PBA receives IP voice data packets and processes the IP voice data packets for output to a phone jack.

2. The wireless STB of claim 1, wherein the first broadband link is at:
least one of a WIMAX and an LTE radio channel.

3. The wireless STB of claim 1, wherein the first broadband link is a 4G radio channel and the second broadband link is at least one of a 5G, 3.5G, 3G, 2.5G, and 2G Cellular radio channel.

4. The wireless STB of claim 1, wherein the first broadband link is an IPTV signal and the second link is a web-based link providing digital TV reception, web-based gaming, web browsing, email capability, video-conferencing, and IP telephony services.

5. A wireless STB comprising:
multiple antennas for capturing plural downstream transmissions on dedicated receivers using a plurality of modem technologies without the use of wires to the home; and a processor to establish, based on at least one of predefined metrics and priority schemes, data traffic links to at least two of the plurality of modem technologies simultaneously;

wherein the STB includes a main board providing power and coupled to a frequency board assembly (FBA), a TV board assembly (TVBA) and a phone board assembly (PBA), and including the processor;

wherein the FBA further comprises the multiple antennas which capture RF signals, including IP data packets, from one of the wireless links, the FBA further decoding, filtering, and delivering the RF signals to a first memory within the FBA where a strongest signal received is identified and converted into video IP data packets;

wherein the video IP data packets are sent from the FBA to the TVBA via a corresponding internal input connection;

wherein the video IP data packets are processed in the TVBA and fed into a second memory within the TVBA where they are converted into an appropriate display format;

wherein the TVBA further comprises a digital tuner receiving a separate TV signal input, the separate TV signal input being processed in the TVBA and fed into the second memory where the signal is converted into an appropriate display format; and wherein the PBA receives IP voice data packets and processes the IP voice data packets for output to a phone jack.

6. The wireless STB of claim 5, wherein each data traffic link is at least one of a simple broadcast link, a unicast link, and a multicast link.

7. The wireless STB of claim 6, wherein the assignment of traffic links to the one or the other of the at least two of the plurality of modem technologies, is a function of desired user data traffic.

8. The wireless STB of claim 6, wherein the assignment of traffic links to the one or the other of the at least two of the plurality of modem technologies, is a function of predefined quality of service requirements.

9. The wireless STB of claim 5, wherein the plural downstream transmissions include IPTV, digital TV, web TV, radio web, VoIP communications, media player web support, web based video gaming, and video streaming.

10. The wireless STB of claim 5, further comprising a GPS modem.

11. The wireless STB of claim 5, further comprising means for processing surveillance type data traffic captured by external peripherals and linked to the STB through one of the multiple antennas.

12. The wireless STB of claim 5, wherein each of at least two modem technologies are operated by different network carriers.

13. The wireless STB of claim 12, further comprising means for registering with the servicing network carriers of a given data link in a seamless and automatic manner to the user.

14. The wireless STB of claim 12, wherein the STB is configured to operate on an associated network of each of the different network carriers prior to customer delivery of the STB.

15. The wireless STB of claim 14, further comprising means for configuring the STB to register and operate on the network carriers with whom partnership agreements exist.

16. The wireless STB of claim 14, wherein the configuring of the STB to operate on an associated network further involves configuring the STB to establish a broadband (internet) session through previously assigned or negotiated channel assignments.

17. The wireless STB of claim 12, wherein the different network carriers include a first operator of a WIMAX network, and a second operator of an LTE radio channel network.

18. The wireless STB of claim 12, wherein the different network carriers include a first: operator of a 4G radio channel network, and a second operator of any one of a 5G, 3.5G, 3G, 2.5G, and 2G cellular radio channel network.

19. The wireless STB of claim 5, wherein the data traffic links include a first broadband link to an IPTV signal serviced by a first corresponding network, and a second link to a web-based link providing digital TV reception, web-based gaming, web browsing, email capability, video-conferencing, and IP telephony services and serviced by a second corresponding network.

20. The wireless STB of claim 5, wherein the processor establishes data links over specific predefined channels associated with secure proprietary frequency allocations in order to manage bandwidth and scheduling resources associated with IPTV signals.

21. The STB of claim 20, further comprising a plurality of memories, each configured to buffer data traffic from a corresponding network carrier received over an associated one or more of the multiple antennas.

22. The wireless STB of claim 12, wherein the network carriers are configured to introduce a delay in transmission signals broadcast to the STB, the STB further comprising means for bandwidth capacity optimization on the basis of the delay in received signal transmissions from the network Carriers.

23. The STB of claim 22, further comprising a plurality of memories, each configured to buffer data traffic from a corresponding network carrier received over an associated one or more of the multiple antennas.

* * * * *

UNITED STATES PATENT AND TRADEMARK OFFICE
CERTIFICATE OF CORRECTION

| | | |
|---|---|---|
| PATENT NO. | : 8,819,757 B2 | Page 1 of 1 |
| APPLICATION NO. | : 13/374721 | |
| DATED | : August 26, 2014 | |
| INVENTOR(S) | : Manolo Fabio Rivera | |

It is certified that error appears in the above-identified patent and that said Letters Patent is hereby corrected as shown below:

On the Title page

Line 6, (Other Publications):

Delete "IPTVE" and insert -- IPTV --, therefor.

Line 10, (Abstract):

Delete "You Tube" and insert -- YouTube --, therefor.

In the Specification

Column 3, Line 45:

Delete "You Tube" and insert -- YouTube --, therefor.

Column 4, Line 45:

Delete "You Tube" and insert -- YouTube --, therefor.

Signed and Sealed this
Fourteenth Day of July, 2015

Michelle K. Lee
*Director of the United States Patent and Trademark Office*